United States Patent [19]

Atlas et al.

[11] Patent Number: 4,874,308
[45] Date of Patent: Oct. 17, 1989

[54] VACUUM ASSISTED TRANSFER MOLD AND VENT PIN

[76] Inventors: George N. Atlas, 30 E. Brown Rd. #1102, Mesa, Ariz. 85201; Leroy C. Donnally, 3425 N. 42nd St., Phoenix, Ariz. 85018; Donald P. Urban, 2639 W. La Senda, Mesa, Ariz. 85202; James M. Perkins, 2230 W. Hayward, Phoenix, Ariz. 85021; Timothy C. Wilson, 42798 Twilight Ct., Rancho California, Calif. 92390

[21] Appl. No.: 177,195

[22] Filed: Apr. 4, 1988

[51] Int. Cl.[4] .................. B29C 45/02; B29C 45/34
[52] U.S. Cl. ......................... 425/544; 249/68; 249/141; 249/187.1; 425/116; 425/129.1; 425/546; 425/556; 425/812
[58] Field of Search .............. 425/116, 129.1, 544, 425/546, 556, 420, 444, 812; 249/141, 67, 68, 187.1; 164/234, 410

[56] References Cited

U.S. PATENT DOCUMENTS

| | | | |
|---|---|---|---|
| 3,555,620 | 1/1971 | Bucy | 425/546 |
| 3,885,618 | 5/1975 | Hodler | 164/410 |
| 4,126,291 | 11/1978 | Gilbert et al. | 425/812 |
| 4,140,470 | 2/1979 | Pasch et al. | 425/544 |

FOREIGN PATENT DOCUMENTS

| | | | |
|---|---|---|---|
| 57-117936 | 7/1982 | Japan | 425/544 |
| 58-68940 | 4/1983 | Japan | 425/546 |
| 58-194522 | 11/1983 | Japan | 425/546 |
| 62-273742 | 11/1987 | Japan | 425/544 |

*Primary Examiner*—James C. Housel
*Attorney, Agent, or Firm*—Charles R. Lewis; Raymond J. Warren

[57] ABSTRACT

The mold described has walls disposed about the mold plates and vent pin retainer plates to permit a vacuum to be generated. The vent pins have been designed to be self cleaning. A pin having a generally cylindrical shape is used. A first portion of the pin has a face defined by a chord of the cylinder. The face leaves a small space between the pin and the opening wall which permits the atmosphere to be removed from the cavity. Below the first portion is a second portion, smaller in diameter than the first portion. Below the second portion is a third portion of essentially the same design as the first portion rotated 45°. This portion cleans the walls of the opening when the pin is raised to eject the parts.

10 Claims, 2 Drawing Sheets

VACUUM ASSISTED TRANSFER MOLD AND VENT PIN

BACKGROUND OF THE INVENTION

The present invention relates, in general, to transfer molds and, more particularly, to vacuum assisted transfer molds.

One use of transfer molds is to encapsulate electronic devices in plastic. In particular, semiconductor devices (die) mounted on some form of lead frame are encapsulated in plastic. This encapsulation is accomplished by placing the leadframe, with the die attached, on a bottom mold plate. A top mold plate is then lowered onto the bottom mold plate. A cavity is formed by the mold plates about the die. A clamping pressure is exerted on the mold plates while a ramp tip is inserted in an opening, or pot. A series of runners couple the cavities of the mold to the pot area. Liquid plastic is then forced through the pot and runners, into the cavities.

A problem which arises in this process is from air being trapped within the cavity area. This can create voids in the plastic which, in the worst case, will not cover the semiconductor die.

This problem is compounded in some devices which have heat sinks incorporated within the plastic. The thickness of plastic about the heat sink is required to be thin, on the order of 0.010 to 0.015 inches, to minimize the degradation in heat transfer. Because of the location and the thinness of the plastic required, this is greatly effected by voids. A void can allow electrical contact or arcing between the heat sink and the surface to which it is mounted.

Accordingly, it is an object of the present invention to provide a mold system that overcomes the above deficiencies.

A further object of the present invention is to provide a mold system which utilizes a vacuum.

Another object of the present invention is to provide a mold system with a self cleaning vent pin.

Still another object of the present invention is to provide a mold system for encapsulating semiconductor devices.

The above and other objects and advantages of the present invention are provided by the vent pin and mold system described herein.

SUMMARY OF THE INVENTION

A particular embodiment of the present invention consists of a vacuum assisted transfer mold with an improved vent pin design. This pin consists of a shaft having a first portion with a generally cylindrical shape and having a face defined by a chord. A second portion of the pin is a recessed groove about the circumference of the shaft. A third portion of the shaft has the same design as the first portion rotated approximately 45°.

In operation, when plastic is being injected into the mold, a vacuum is pulled through the cavity in which the pin is disposed. This vacuum is pulled through the opening left between the chord face and the wall of the pin cavity. Because there is an opening, some resin from the plastic is pulled into the pin cavity. When the pin rises to eject the parts, the third portion of the shaft wipes the wall of the pin cavity. This helps prevent the pin cavity from becoming clogged.

DETAILED DESCRIPTION OF THE DRAWINGS

Figure 1:
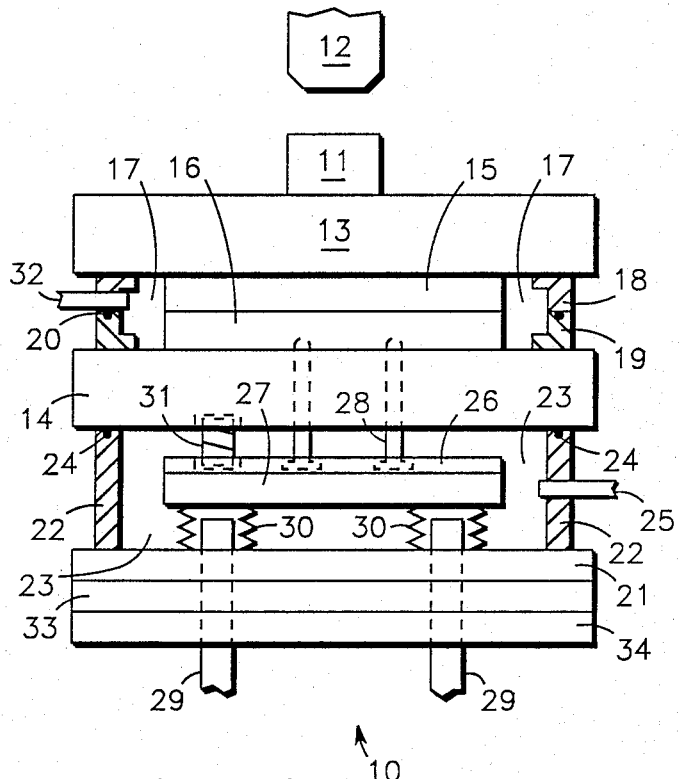
FIG. 1 is a side view of a simplified transfer mold system embodying the present invention.

Referring first to the drawing in FIG. 1, a side view of a simplified mold system, generally designated 10, embodying the present invention is illustrated. Mold 10 consists of a pot 11, into which a ram tip 12 may be disposed. Pot 11 is coupled to a top mold base 13. A bottom mold base 14 is disposed below top mold base 13. Between top and bottom mold bases 13 and 14 are top and bottom mold plates 15 and 16, respectively. The devices to be encapsulated are disposed between top and bottom mold plates 15 and 16.

Disposed about plates 15 and 16 is a first vacuum chamber 17 defined by top and bottom vacuum chamber walls 18 and 19 respectively. Between walls 18 and 19 is a seal, such as an O'ring, 20. Located in wall 18 is a coupling 32 used for connection of a vacuum pump, not shown. In operation, as plates 15 and 16 are closed and clamped together, walls 18 and 19 are also closed and clamped on O'ring 20. This forms chamber 17 which can have the atmosphere evacuated therefrom.

Disposed below bottom mold plate 14 is a backup means consisting of backup plate 21, an insulation plate 33, and a skid plate 34. Between plates 14 and 21 is a wall 22. Plates 14 and 21 and wall 22 act together to form a second vacuum chamber 23. In this particular embodiment, wall 22 is coupled to plate 21 and has a seal, O'ring, 24 to seal against plate 14. A coupling 25 is provided in wall 22 for connection of a vacuum pump, not shown.

Disposed within chamber 23 are top and bottom ejection pin retainer plates, 26 and 27, respectively. Top retainer plate 26 has a plurality of counter sunk holes drilled therein. A plurality of vent/ejector pins 28 are disposed through the holes in plate 26. Retainer plates 26 and 27 are then secured together to hold pins 28 in place.

As shown in FIG. 1, pins 28 extend through bottom mold base 14 and into bottom mold plate 16. Generally, one pin 28 is provided for each device being molded. During the molding process, a vacuum is drawn in chambers 17 and 23 by pulling atmosphere out through openings 25 and 32.

When the molding process is completed, plates 21, 33 & 34 are lowered. Lowering plates 21, 33, 34 causes push back rods 29, which extend through an opening in plates 21, 33 and 34 to contact a bottom retainer plate 27. Plates 26 and 27 will then rise in relation to plate 21. This, in turn, raises pins 28 into the cavities of plate 16 to eject the molded devices from bottom mold plate 16, which is now separated from top mold plate 15.

Figure 6:
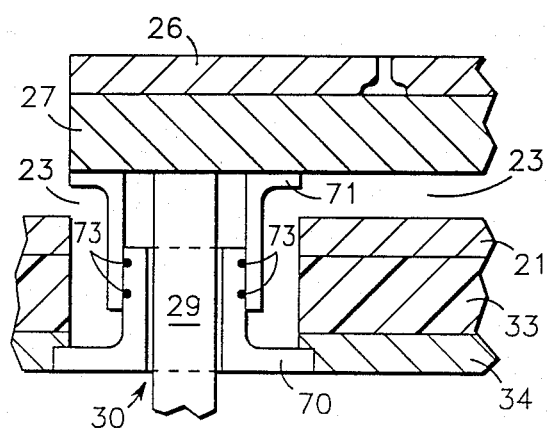
FIG. 6 is a cross sectional view of a reciprocating seal used in a mold system embodying the present invention.

Between bottom retainer plate 27 and backup plate 21 are reciprocating seals 30 through which rods 29 extend. It should be noted here that the illustration of seals 30 in FIG. 1 is merely representative and that an actual configuration is illustrated in FIG. 6. Seals 30 are provided to maintain the integrity of chamber 23 while permitting rods 29 to pass through plates 21, 33 and 34.

When the molded parts have been removed and a new set of devices have been inserted in mold plate 16, plates 21, 33 and 34 are raised. Rods 29 will lower in relation to plate 21. In order to ensure that pins 28 are retracted back into plate 16, a shoulder bolt with a spring 31 is disposed between bottom mold base 14 and top retainer plate 26. When the pressure caused by rods 29 is removed from plate 27, spring 31 forces base 14 and plate 26 apart thereby drawing pins 28 into plate 16.

Figure 2:
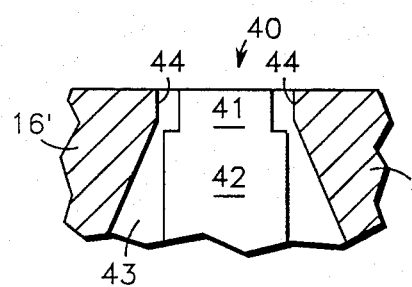
FIG. 2 is a cross sectional view of a prior art vent pin.

Referring now to FIG. 2, a cross sectional view of a prior art vent pin 40 is illustrated in an opening 43 of a bottom mold plate 16'. Pin 40 has two portions: upper portion 41 which is recessed, and lower portion 42. When the atmosphere is evacuated from the cavities, it is drawn down around portion 41 of pin 40 and into opening 43. In operation, it was intended that pin 40 extend out of plate 16' and have portion 42 clean a wall 44 of plate 16'. However, in operation several problems develop. First, because portion 41 of pin 40 is smaller than opening 43, pin 40 becomes offset in opening 43. This offset is caused by the atmosphere and plastic being transferred into opening 43. When the attempt is made to raise pin 40, it can become jammed in opening 43 or wear on wall 44 of plate 16 causing opening 43 to be offset and enlarged. In addition, plastic is transferred into opening 43 about portion 42 of pin 40. This plastic is not removed when pin 40 is raised and can result in blockage which will prevent a vacuum from being pulled.

Figure 3:
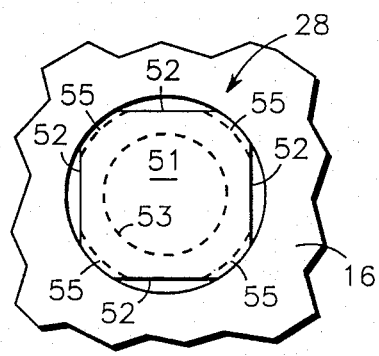
FIGS. 3-5 are top and side views of a vent pin used in a mold system embodying the present invention.
Figure 4:
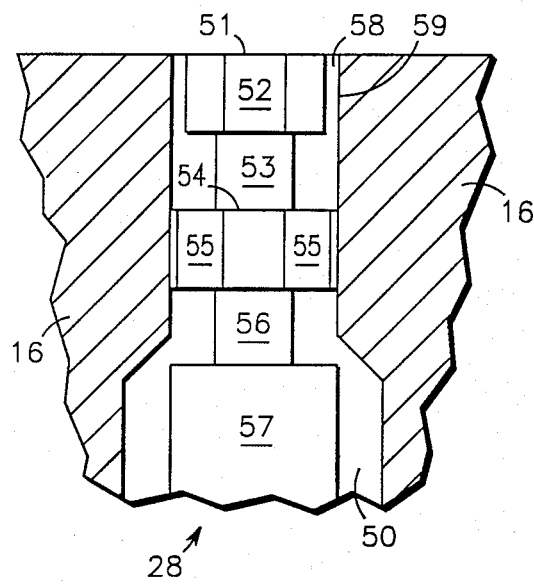
Figure 5:
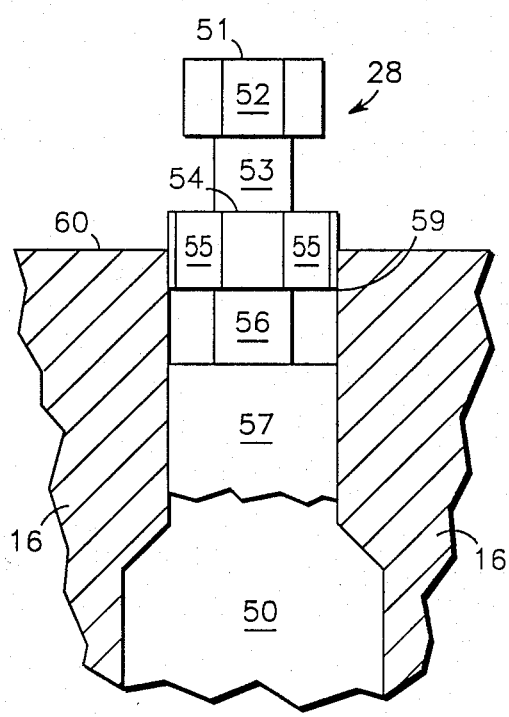

In order to overcome these problems, a pin, generally designated 28 in FIGS. 3-5, embodying the present invention was developed. Pin 28 is disposed in an opening 50 of bottom mold plate 16. Pin 28 consists of four basic portions. A first portion 51 is cylindrical in shape with cords defining faces 52. A second portion 53, disposed below portion 51, is cylindrical in shape and recessed. Below portion 53 is a third portion 54. Portion 54 is generally the same shape as portion 51 rotated 45°. Portion 53 has faces 55 defined by chords in its otherwise cylindrical shape. Below portion 54 is a fourth portion 56. This is an optional portion and is the same design as second portion 53. A shaft 57 is disposed below optional portion 56. If portion 56 is now used, shaft 57 is coupled directly to third portion 54.

In FIG. 4, pin 28 is shown in the retracted position. This is the position that is maintained during the molding operation. During molding, , a vacuum is created in the cavity located below pin 28. The atmosphere is drawn through a gap 58 formed by faces 52 and a wall 59 of plate 16; around opening 50 about portion 53; through a gap formed by faces 55 and wall 59 of plate 16; and into area 15 about portion 56 and shaft 57.

Gap 58 is on the order of 0.001" wide. This width is narrow enough to allow the atmosphere to escape while blocking the plastic from entering. Although the plastic is blocked, the less viscous resin material in the plastic can enter gap 58. This resin material will flow through gap 58 into the area adjacent portion 53. The resin typically does not flow around portions 54 and 56.

Once the molding operation is completed, pin 28 is raised; ejecting the molded parts. The raised position of pin 28 is illustrated in FIG. 5. Pin 28 is raised to a point where portions 51, 53 and part of 54 extend above a surface 60 of plate 16. Since portions 51 and 54 are offset 45° from each other, any resin that has built up in gap 58 is scraped from wall 59.

Therefor, pin 28 provides: an opening through which the atmosphere can be drawn; and a self cleaning function.

Referring now to FIG. 6, a more detailed drawing of reciprocating seal 30, through which rod 29 extends, is illustrated, Seal 30 consists basically of an inner flange 70 slideably disposed in an outer flange 71. Disposed about flange 70, between flanges 70 and 71, are seals 73. These seals maintain the isolation of cavity 23 from the outside atmosphere. As illustrated, flange 70 is attached to an opening in skid plate 34. Flange 71 is coupled to bottom retainer plate 27 and may extend into the openings of plates 21, 33 and 34. Rod 29 then extends through flanges 70 and 71 and may contact plate 27 without breaking the vacuum of chamber 23.

Thus, it will be apparent to one skilled in the art that there has been provided in accordance with the invention, a device that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A vacuum assisted transfer mold comprising:
    mold plate means for forming a cavity about a device to be encapsulated;
    a top mold base coupled to the top of said mold plate means;
    a bottom mold base coupled to the bottom of said mold plate means;
    first vacuum wall means for creating an atmospheric seal about said mold plate means, said first vacuum wall means being disposed between said top and bottom mold bases;
    a backup plate coupled to said bottom mold base opposite said mold plate means;
    an opening extending through said bottom mold base;
    a vent pin extending through said opening in said bottom mold base into said mold plate means;
    vent pin retaining means for retaining a base portion of said pin, said retaining means being disposed between said bottom mold base and said backup plate; and
    second vacuum wall means for creating an atmospheric seal about said vent pin retaining means, said second vacuum wall means being disposed between said bottom mold base and said backup plate;
    said vacuum wall means including means through which a vacuum can be applied to said transfer mold;
    said vent pin retaining means including means for axially moving said vent pin within said openng in said bottom mold base to cause said vent pin to enter said cavity and function as an ejector;
    said vent pin having first and second surface portions therealong that are configured to cooperate in said opening in said bottom mold base whereby said vent pin operates to vent said cavity and clean said opening in said bottom mold base;
    a seal capable of reciprocal motion coupled between said vent pin retaining means and said backup plate; and a push rod extending through said backup plate and surrounded by said seal to enable said vent pin retaining means to be reciprocated between said backup plate and said bottom mold base.

2. The vacuum assist transfer mold of claim 1 wherein said seal includes a reciprocating seal that comprises:
   a first flange being coupled to said backup plate;
   a second flange being slideably coupled to said first flange and being coupled to said vent pin retaining means; and
   seal being disposed between said first and second flanges.

3. The vacuum assisted transfer mold of claim 1 wherein said mold plate means comprises:
   a top mold plate coupled to said top mold base; and
   a bottom mold plate coupled to said bottom mold base.

4. The vacuum assisted transfer mold of claim 1 wherein said first vacuum wall means comprises:
   a top portion disposed about said mold plate means and coupled to said top mold base;
   a bottom portion disposed about said mold plate means and coupled to said bottom mold base; and
   a seal disposed between said top and bottom portions.

5. The vacuum assisted transfer mold of claim 1 wherein said vent pin comprises:
   a first portion of generally cylindrical shape having a first diameter, at least one face thereon defined by a chord of said first portion, a first end, and a second end;
   said first end of said first portion being adjacent said cavity;
   a second portion of generally cylindrical shape having a first end coupled to said second end of said first portion, a second end, and a second diameter less than said first diameter;
   a third portion of a generally cylindrical shape having said first diameter, at least one face thereon defined by a chord of said third portion, a first end coupled to said second end of said second portion, and a second end; and
   a fourth portion having a generally cylindrical shape of said first diameter, and a first end coupled to said second end of said third portion.

6. The vacuum assisted transfer mold of claim 5 wherein said pin further comprises a fifth portion disposed between said second end of said third portion and said first end of said fourth portion, said fifth portion being generally cylindrical in shape and having said second diameter less than said first diameter.

7. The vacuum assisted transfer mold of claim 1 wherein said vent pin retaining means comprises:
   a top retaining plate defining an opening therein in which said base portion of said vent pin is disposed; and
   a bottom retaining plate coupled to said top retaining plate.

8. The vacuum assisted transfer mold of claim 1 wherein said second vacuum wall means comprises:
   a wall connected to said backup plate and disposed about said vent pin retaining means; and
   a seal disposed between said wall and said bottom mold base.

9. A dual function vent pin for a vacuum assisted transfer mold comprising:
   a first portion of generally cylindrical shape having a first diameter a first end, and a second end;
   a second portion of generally cylindrical shape having a first end coupled to said second end of said first portion, a second end, and a second diameter less than said first diameter;
   a third portion of a generally cylndrical shape having said first diameter, a first end coupled to said second end of said second portion, and a second end;
   a fourth portion of a generally cylindrical shape having said second diameter, a first end coupled to said second end of said third portion, and a second end;
   a fifth portion of generally cylindrical shape having a diameter greater than said second diameter and a first end coupled to said second end of said fourth portion;
   said first surface portion of said vent pin being of generally cylindrical shape having at least one face thereon defined by a chord of said first portion to provide a venting function;
   said third surface portion of said vent pin being of generally cylindrical shape having at least one face thereon defined by a chord of said third portion and rotated around the axis of said pin so as not to be in line with the face on said first surface portion to provide a cleaning function.

10. The dual function pin of claim 9 wherein the face on said first surface is rotated around the axis of said vent pin by about 45° with respect to the face on said third surface.

* * * * *

UNITED STATES PATENT AND TRADEMARK OFFICE
CERTIFICATE OF CORRECTION

PATENT NO. : 4,874,308

DATED : Oct. 17, 1989

INVENTOR(S) : Atlas et al.

It is certified that error appears in the above-identified patent and that said Letters Patent is hereby corrected as shown below:

On the title page:

Column 1, [76], Inventors: change "George N. Atlas"

to "Gary N. Atlas".

Signed and Sealed this

Sixth Day of November, 1990

Attest:

HARRY F. MANBECK, JR.

Attesting Officer

Commissioner of Patents and Trademarks